United States Patent
Ustunel

(10) Patent No.: US 11,643,104 B2
(45) Date of Patent: May 9, 2023

(54) VEHICULAR AUTONOMOUS CONTROL SYSTEM UTILIZING SUPERPOSITION OF MATCHING METRICS DURING TESTING

(71) Applicant: Magna Electronics Inc., Auburn Hills, MI (US)

(72) Inventor: Eser Ustunel, Heidelberg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 266 days.

(21) Appl. No.: 16/949,668

(22) Filed: Nov. 10, 2020

(65) Prior Publication Data

US 2021/0142073 A1    May 13, 2021

Related U.S. Application Data

(60) Provisional application No. 62/704,353, filed on May 6, 2020, provisional application No. 62/970,817, filed
(Continued)

(51) Int. Cl.
*G06V 20/64* (2022.01)
*G06V 20/56* (2022.01)
(Continued)

(52) U.S. Cl.
CPC .............. *G06V 20/56* (2022.01); *B60W 40/02* (2013.01); *G06T 7/143* (2017.01); *G06V 20/64* (2022.01);
(Continued)

(58) Field of Classification Search
CPC ...... G06V 20/56; G06V 20/64; G06V 20/653; G06V 20/58; G06V 10/75; G06V 10/761;
(Continued)

(56) References Cited

U.S. PATENT DOCUMENTS 7,038,577 B2    5/2006   Pawlicki et al.
7,720,580 B2    5/2010   Higgins-Luthman
(Continued)

OTHER PUBLICATIONS

Lin YH et al, Development of an Image Processing Module for Autonomous Underwater Vehicles through Integration of Visual Recognition with Stereoscopic Image Reconstruction, Apr. 2019, J. Mar. Sci. Eng. 7, 107, 1-42. (Year: 2019).*

*Primary Examiner* — Nay A Maung
*Assistant Examiner* — Kathleen M Broughton
(74) *Attorney, Agent, or Firm* — Honigman LLP

(57) ABSTRACT

A method for matching a reference object and a test object includes providing a test object in a field of sensing of at least one sensor disposed at a vehicle. A volume match is determined based on a volume of the reference object and a volume of the test object. A distance match is determined based on a center and orientation of the reference object and a center and orientation of the test object. An angle match is determined based on a yaw angle of the reference object and a yaw angle of the test object. A superposition of the volume match, the distance match, and the angle match is determined based on a multiplication of the volume match, the distance match, and the angle match. A degree of matching of the reference object and the test object is determined based on the superposition.

17 Claims, 8 Drawing Sheets

Related U.S. Application Data on Feb. 6, 2020, provisional application No. 62/933,610, filed on Nov. 11, 2019.

(51) Int. Cl.
*G06T 7/143* (2017.01)
*B60W 40/02* (2006.01)

(52) U.S. Cl.
CPC ... *G06V 20/653* (2022.01); *B60W 2554/4041* (2020.02); *B60W 2554/801* (2020.02); *B60W 2554/802* (2020.02); *B60W 2554/805* (2020.02); *G06T 2207/30252* (2013.01)

(58) Field of Classification Search
CPC ......... B60W 40/02; B60W 2554/4041; B60W 2554/801; B60W 2554/802; B60W 2554/805; B60W 2050/0064; B60W 2520/14; B60W 60/001; G06T 7/143; G06T 2207/30252; G06K 9/6201; G06K 9/6215

See application file for complete search history.

(56) References Cited

U.S. PATENT DOCUMENTS

| | | | |
|---|---|---|---|
| 7,855,755 | B2 | 12/2010 | Weller et al. |
| 8,509,523 | B2* | 8/2013 | Schamp .............. G06K 9/6292 382/104 |
| 9,330,321 | B2* | 5/2016 | Schamp .............. G06V 10/809 |
| 10,841,571 | B2 | 11/2020 | Sigle |
| 10,870,400 | B2 | 12/2020 | Thomas et al. |
| 2009/0228204 | A1* | 9/2009 | Zavoli .................... G01C 21/30 701/532 |
| 2019/0138432 | A1 | 5/2019 | Nagaraj et al. |
| 2020/0256951 | A1 | 8/2020 | Kunkel |
| 2021/0136356 | A1 | 5/2021 | Rinaldo |
| 2021/0201056 | A1 | 7/2021 | Potnis |
| 2021/0201085 | A1 | 7/2021 | Potnis |
| 2021/0255984 | A1 | 8/2021 | Khatri |

* cited by examiner

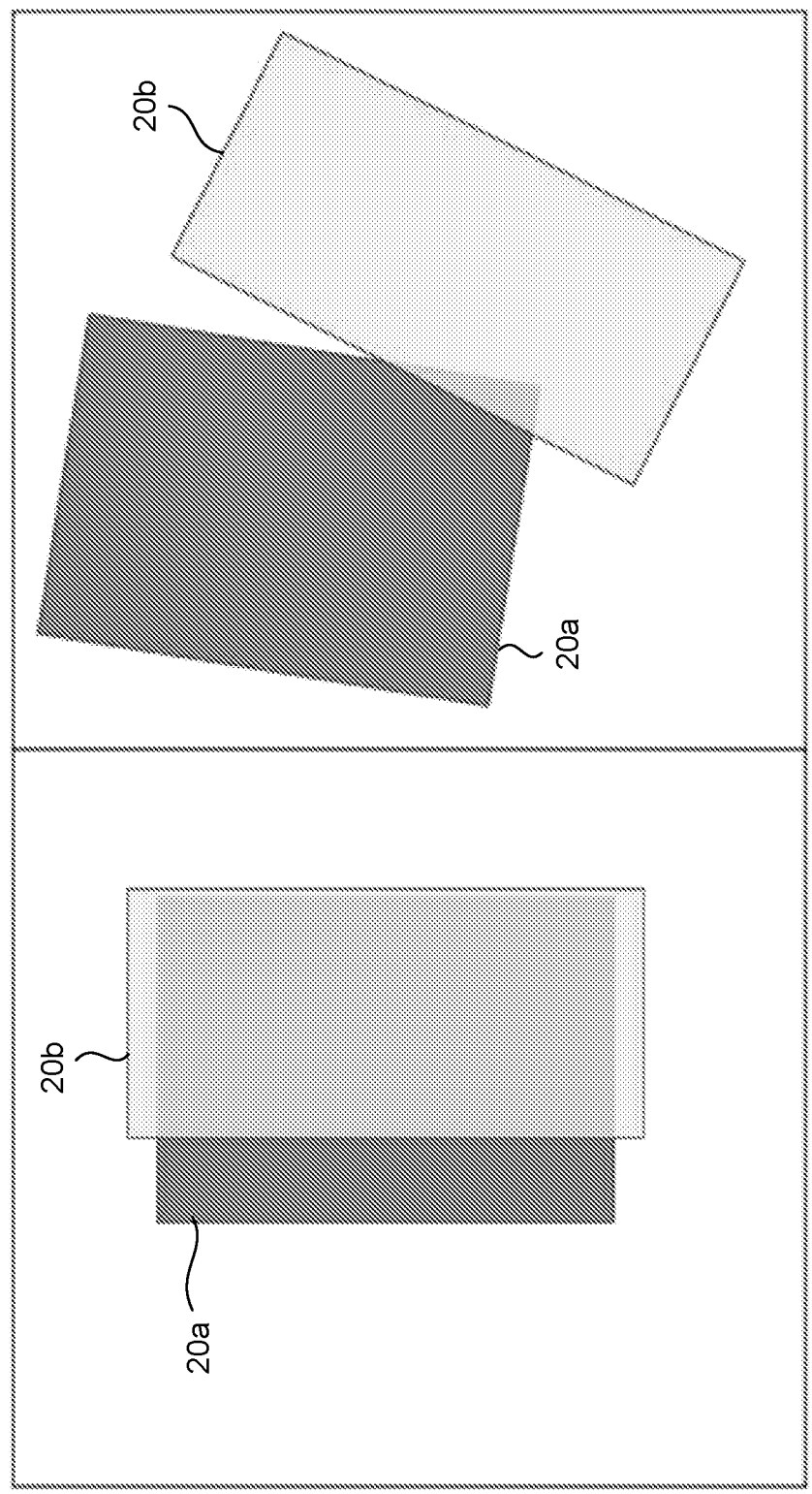

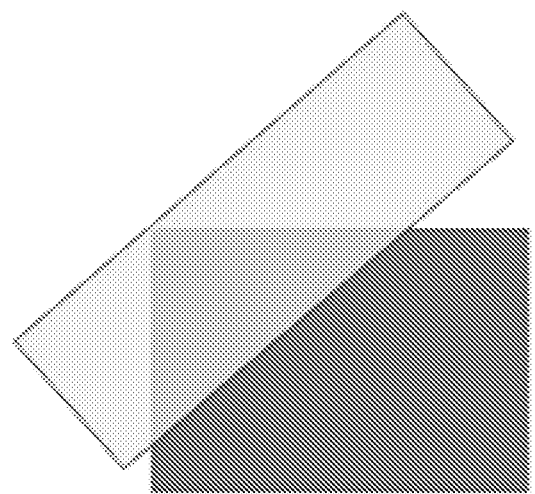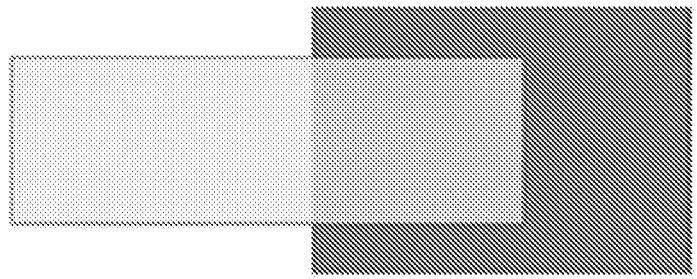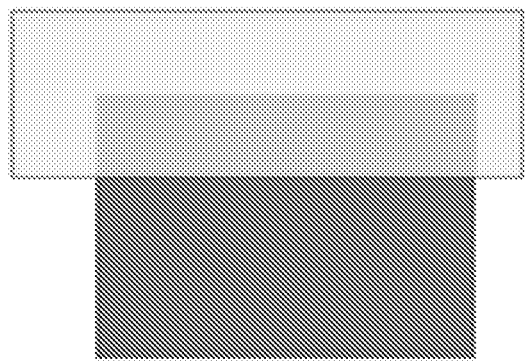
FIG. 8

VEHICULAR AUTONOMOUS CONTROL SYSTEM UTILIZING SUPERPOSITION OF MATCHING METRICS DURING TESTING

CROSS REFERENCE TO RELATED APPLICATIONS

The present application claims the filing benefits of U.S. provisional application Ser. No. 62/704,353, filed May 6, 2020, U.S. provisional application Ser. No. 62/970,817, filed Feb. 6, 2020, and U.S. provisional application Ser. No. 62/933,610, filed Nov. 11, 2019, which are all hereby incorporated herein by reference in their entireties.

FIELD OF THE INVENTION

The present invention relates generally to an autonomous system for a vehicle.

BACKGROUND OF THE INVENTION

Key Performance Indicator (KPI) tests are often performed on autonomous driving systems to ensure safety. These tests often involve a matching algorithm that matches a reference object to an object under test.

SUMMARY OF THE INVENTION

The present invention provides a method for testing a driver assistance system or vision system or imaging system or autonomous system for a vehicle. The method matches a reference object and a test object and includes determining, by an electronic control unit (ECU), a volume match of the reference object and the test object based on a volume of the reference object and a volume of the test object. The method also includes determining a distance match of the reference object and the test object based on a center and an orientation of the reference object and a center and an orientation of the test object. The method also includes determining an angle match of the reference object and the test object based on a yaw angle of the reference object and a yaw angle of the test object. The method also includes determining a superposition of the volume match, the distance match, and the angle match based on a multiplication of the volume match, the distance match, and the angle match and a degree of matching of the reference object and the test object based on the superposition.

These and other objects, advantages, purposes and features of the present invention will become apparent upon review of the following specification in conjunction with the drawings.

BRIEF DESCRIPTION OF THE DRAWINGS

FIGS. 3A and 3B are plan views of intersections between a reference bounding box and a test bounding box;

FIG. 8 are plan views of three different orientations for the same pair of bounding boxes with the same intersection area.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
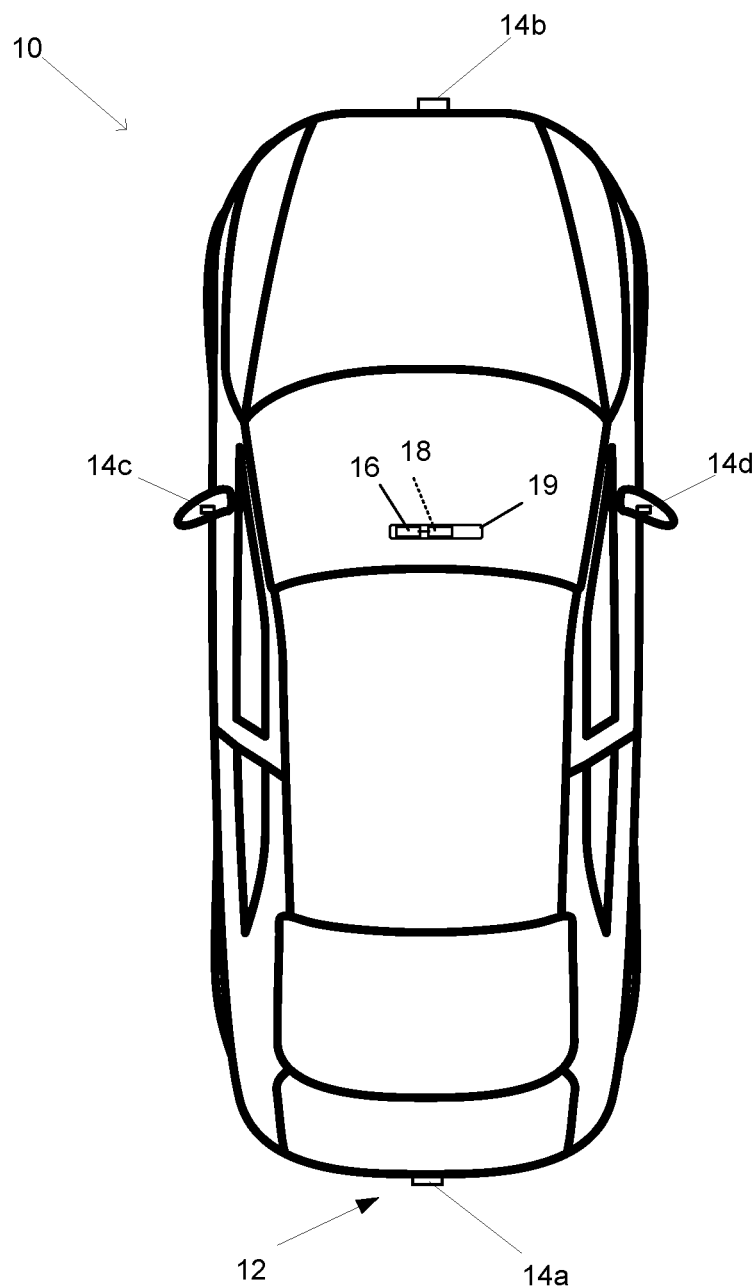
FIG. 1 is a plan view of a vehicle with a vision or perception system that incorporates cameras, lidar and radar sensors in accordance with the present invention.

Referring now to the drawings and the illustrative embodiments depicted therein, a vehicle 10 includes an imaging system or vision system or sensor system 12 that includes at least one exterior viewing sensor (e.g., lidar or radar) or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like).

The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In autonomous driving, Key Performance Indicator (KPI) tests include detection tests (e.g., true positives, false negatives, false positives, and true negatives), classification tests, bias tests, accuracy tests, and uncertainty tests of statistics. When conducting all of these tests during a prepossessing state, a matching algorithm is used. The matching algorithm has an important role between Ground Truth (GT) and Device Under Test (DUT or DT) findings. GT is a reference system while DT is the sensor under development. Performance of the DT should be compared with the GT. During these tests, it is not uncommon for the systems and sensors to be tested for tens of thousands of kilometers. Thus, the matching algorithm that matches the GT and the DT should be fast enough to process terabytes of data. In addition, due to the high level of safety needed with autonomous driving systems, the algorithm should be reliable. Implementations herein fulfill the need for a true matching algorithm for KPI tests in, for example, the automotive industry. Implementations herein provide better metric results and better recognition and classification algorithms.

Figure 2A:
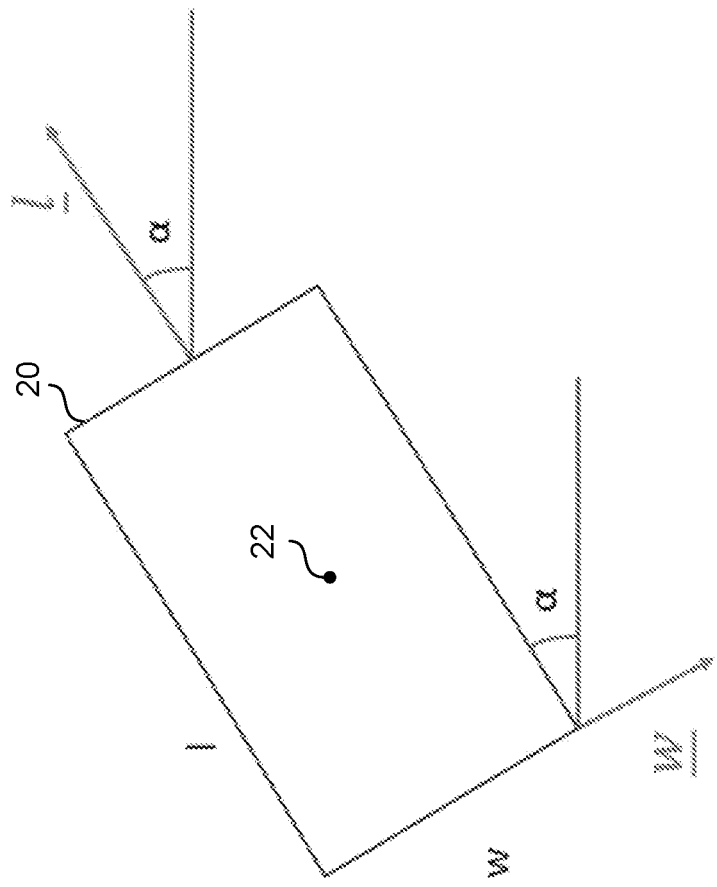
FIGS. 2A and 2B are a perspective view and a plan view of a bounding box.
Figure 2B:
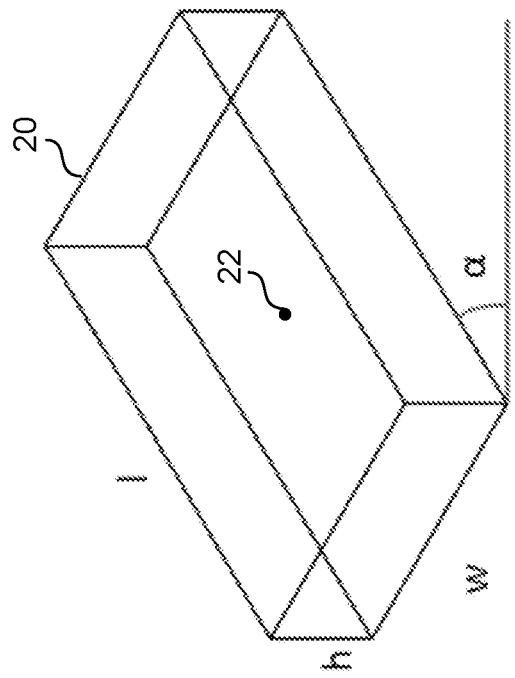

Referring now to FIGS. 2A and 2B, a bounding box 20 may be used to represent traffic objects (e.g., a car, a truck, a bus, a pedestrian, a bicycle, a tractor, etc.), that are moving or stationary on the ground surface near the vehicle. The bounding box 20 may be a rectangular box composed of 7 parameters: x, y, z, l, w, h, and α. The parameters x, y, and z define coordinates of a center 20 of the bounding box 20. The parameter l is length, the parameter w is width, and the parameter h is height of the bounding box. The parameter α is a yaw angle of the box as well as a driving direction of the bounding box 20 (such as relative to the longitudinal axis or driving direction of the vehicle under test). FIG. 2A illustrates a perspective view of the bounding box 20 while FIG. 2B illustrates a bird's-eye view of the bounding box 20. Without losing generality, it is assumed that l≥w. When the bounding box represents a moving object, it can usually be assumed that the driving direction of the object is along the length of the bounding box.

One or more sensors of the vehicle (e.g., cameras, lidar, radar, etc.) may capture sensor data indicative of the parameters of the test object (i.e., DT). A control of the vehicle may process the sensor data to determine the parameters. A processor may receive both the determined parameters from the DT object and parameters of the reference object (i.e., GT). The processor may use these parameters to perform the matching. The processor may be disposed at the vehicle or remote from the vehicle. For example, the parameters may be extracted from the vehicle (e.g., via wired or wireless communication) and evaluated at a processor remote from the vehicle.

Referring now to FIGS. 3A and 3B, when evaluating whether a reference object or reference bounding box 20a (i.e., a GT bounding box) and a test object or test bounding box 20b (i.e., a DT bounding box) are matching, if the bounding boxes 20a, 20b have a greater intersection area, both bounding boxes 20a, 20b are a possible matched pair (FIG. 3A). When the bounding boxes 20a, 20b have a smaller intersection area or they are separated on x-y plane, the bounding boxes 20a, 20b are potentially unmatched objects (FIG. 3B). Thus, matching, as used herein, is similar to associating or correlating the objects.

Figure 4:
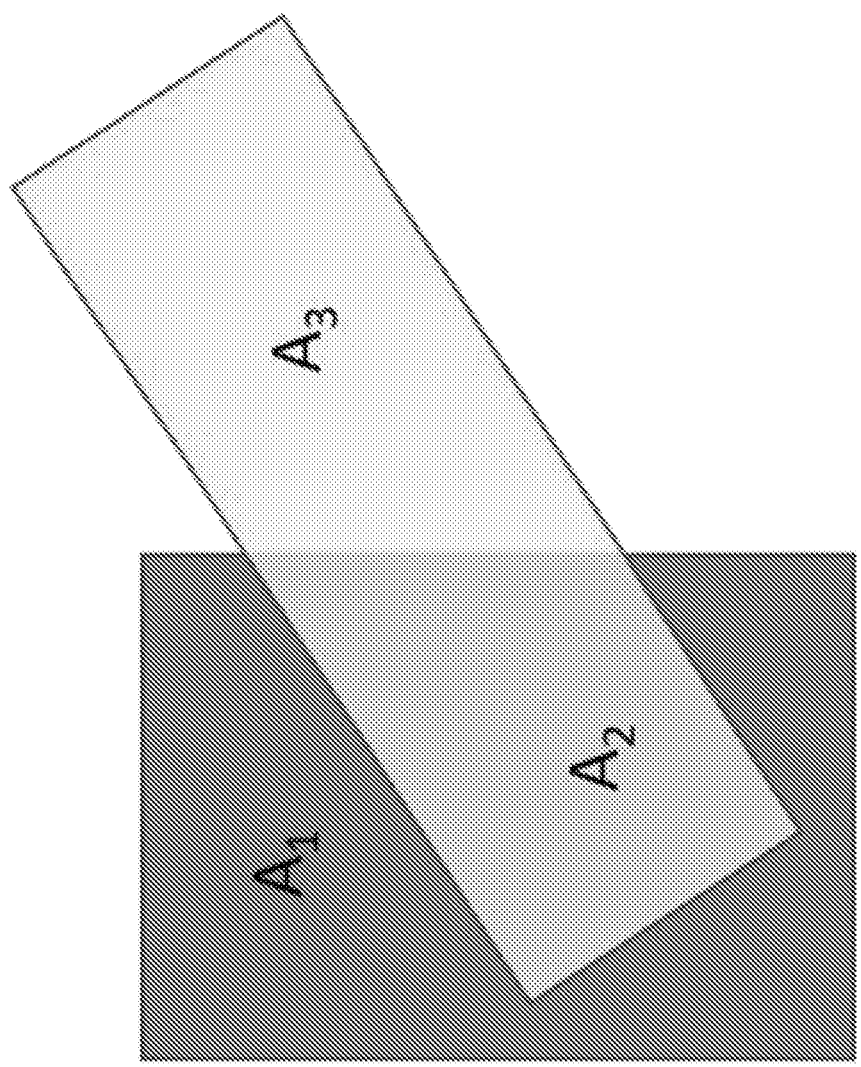
FIG. 4 is another plan view of an intersection between a reference bounding box and a test bounding box.

Intersection over union (IOU) is a method commonly used for matching. It is the ratio of intersected area to all union area as illustrated in FIG. 4 and Equation 1.

$$IOU = \frac{A_2}{A_1 + A_2 + A_3} \quad (1)$$

A drawback of the IOU method is that the method uses complex geometry to calculate that may take significant computational resources. This complex geometry may require special software libraries or programs (e.g., Shapely package in Python). Another disadvantage is that for close objects, if $A_2=0$, the metric is zero. Far away objects will also have a metric of zero. Furthermore, for orientations that result in the same $A_2$ (e.g., even with different orientations and/or distances), the IOU metric will remain the same. Therefore, both cases are not separable or distinguishable for the IOU method. Thus, the IOU method may not give valuable information when there is not an intersection or there is an equivalent intersection area between the objects.

Implementations described herein provide a superposition of metrics (SOM) comprised of three parts: volume match (VM), distance match (DM), and angle match (AM). These three factors are multiplied together to determine the SOM (i.e., SOM=VM*DM*AM). The superposition of metrics is a smart superposition of three geometric factors embedded in the seven parameters of the bounding box (i.e., x, y, z, l, w, h, and α) in the way of multiplication.

The Volume Match (VM) evaluates a matching in volumes of GT bounding boxes and DT bounding boxes. Volume matching is defined in Equation 2.

$$VM = \min\left(\frac{V_{GT}}{V_{DT}}, \frac{V_{DT}}{V_{GT}}\right) \quad (2)$$

Here, $V_{GT}$ is the volume of the GT bounding box and $V_{DT}$ is the volume of the DT bounding box. The maximum value for VM is 1 which occurs when $V_{GT}=V_{DT}$. As seen from Equation 2, VM gets smaller as the difference between $V_{GT}$ and $V_{DT}$ grows. Therefore, the volume matching provides the ability to reject false matches between, for example, a car and a truck or between a pedestrian and a car. The volume of the GT and DT bounding boxes is defined in Equation 3.

$$V=l*w*h \quad (3)$$

The Distance Match (DM) combines the distance of the bounding box centers and orientation of the bounding boxes together in a Gaussian distribution equation. The orientation may be measured as a variance (var) using the length (l), the width (w), and the height (h) of each box. The exponential term of Gaussian distribution is shown in Equation 4.

$$DM = \exp\left(-K_{DM}\frac{d^2}{\text{var}}\right) \quad (4)$$

Here, $K_{DM}$ is a constant parameter (e.g., 1.33) and d is the distance where $d^2$ is the square distance in three dimensions between the GT bounding box and the DT bounding box as illustrated in Equation 5.

$$d^2=(x_{GT}-x_{DT})^2+(y_{GT}-y_{DT})^2+(z_{GT}-z_{DT})^2 \quad (5)$$

The variance var is an approximate variance and averages all dimensions of both GT and DT bounding boxes. The variance is defined by Equation 6.

$$\text{var} = \frac{l_{GT} + w_{GT} + l_{DT} + w_{DT} + c_h(h_{GT} + h_{GT})}{2 + c_h} \quad (6)$$

The variable $c_h$, is a weight for the heights of the bounding boxes and is between zero and one (i.e., $0 \leq c_h \leq 1$).

Figure 5B:
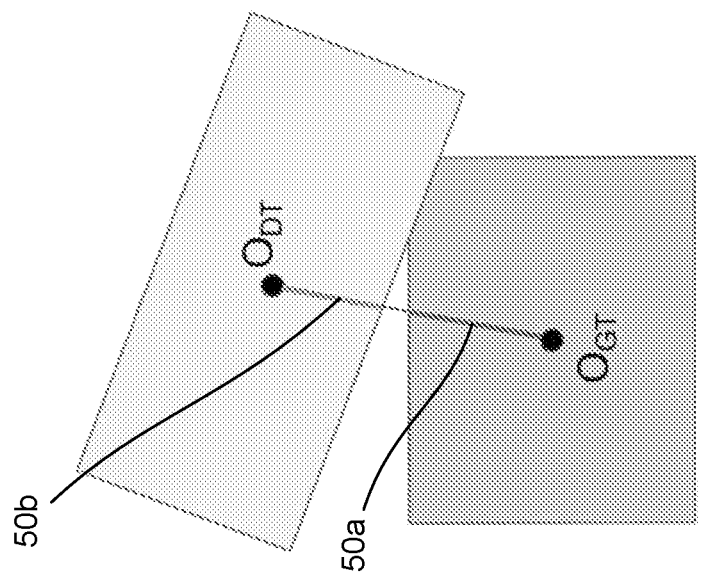
FIGS. 5A and 5B are plan views of distance matching between a reference bounding box and a test bounding box.
Figure 5A:
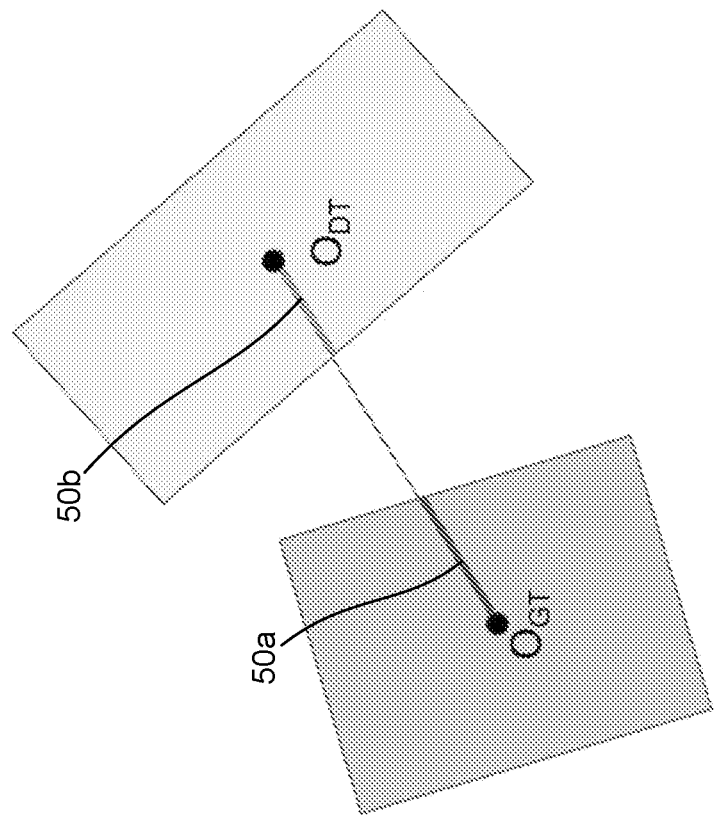

Referring now to FIGS. 5A and 5B, the possible intersection length of the GT bounding box and the DT bounding box is illustrated. It may be assumed that the bottom surfaces of vehicles on the road are always parallel to the world surface or ground or road), and thus $c_h$ will generally be a small value. Without losing the generality, it may be assumed that $c_h$ is 0. That is, a logical approximation is that the intersection of the GT and DT bounding boxes occurs on the x-y plane. From here, using Equation 6, an optimal variance var may be determined, which finds the projection length of the DT and GT bounding boxes on the axis of unit distance vector (FIG. 5A and FIG. 5B). Here, the variance var is the sum of the line segments 50a, 50b. Unit distance vector ($d_{vec}$) is a unit vector from the center of the GT bounding box to the center of the DT bounding box and is represented by Equation 7.

$$d_{vec} = \frac{o_{DT} - o_{GT}}{d} = \frac{\begin{bmatrix} x_{DT} \\ y_{DT} \end{bmatrix} - \begin{bmatrix} x_{GT} \\ y_{GT} \end{bmatrix}}{d} \quad (7)$$

Because var is the summation of terms for the GT bounding box and the DT bounding box, var may be mathematically represented as shown in Equation 8.

$$\text{var} = \text{var}_{GT} + \text{var}_{DT} \quad (8)$$

The variable $\text{var}_{GT}$ is represented by the line segment 50a and may be determined by Equations 9, 10, and 11.

$$[d_{vec} \cdot \underline{w}_{GT}]l_{GT} \geq [d_{vec} \cdot \underline{l}_{GT}]w_{GT} \quad (9)$$

$$\text{var}_{GT} = \frac{w_{GT}}{2\sin(\text{acos}[\underline{d}_{vec} \cdot \underline{l}_{GT}])} \quad (10)$$

$$\text{var}_{GT} = \frac{l_{GT}}{2\sin(\text{acos}[\underline{d}_{vec} \cdot \underline{w}_{GT}])} \quad (11)$$

Here, when Equation 9 evaluates as true, then $\text{var}_{GT}$ is represented by Equation 10, otherwise, $\text{var}_{GT}$ is represented by Equation 11. In these equations, $\underline{w}_{GT}$ is width a vector of the GT bounding box. The amplitude is $w_{GT}$ and the angle is $$\alpha_{GT} + \frac{\pi}{2}.$$

The variable $\underline{l}_{GT}$ represents a length vector of the GT bounding box and its angle is represented by $\alpha_{GT}$. Here, it is important to note that $\underline{w}_{GT}$ and $\underline{l}_{GT}$ are perpendicular to each other as illustrated in FIG. 2B. The variable $\underline{d}_{vec}$ represents a unit vector on the distance line between $O_{GT}$ and $O_{DT}$ and its direction from GT to DT (FIGS. 5A and 5B).

Similarly, $\text{var}_{DT}$, which is the length of the line segment 50b, may be determined by Equations 12, 13, and 14.

$$[\underline{d}_{vec} \cdot \underline{w}_{DT}]l_{DT} \geq [\underline{d}_{vec} \cdot \underline{l}_{DT}]w_{DT} \quad (12)$$

$$\text{var}_{DUT} = \frac{w_{DT}}{2\sin(\text{acos}[\underline{d}_{vec} \cdot \underline{l}_{DT}])} \quad (13)$$

$$\text{var}_{DUT} = \frac{l_{DT}}{2\sin(\text{acos}[\underline{d}_{vec} \cdot \underline{w}_{DT}])} \quad (14)$$

Here, when Equation 12 evaluates as true, then $\text{var}_{DT}$ is represented by Equation 13, otherwise, $\text{var}_{DT}$ is represented by Equation 14. Here, $\underline{w}_{DT}$ is a width vector of the DT bounding box. The amplitude is $w_{DT}$ and the angle is $\alpha_{DT} + \pi/2$. The variable $\underline{l}_{DT}$ represents a length vector of the DT bounding box and its angle is represented by $\alpha_{DT}$. Again it is important to note that $\underline{w}_{DT}$ and $\underline{l}_{DT}$ are perpendicular to each other (FIG. 2B).

As used herein, the variance var is the measure of dispersion of both DT and GT bounding boxes on the distance line of centers of the bounding boxes. In other words, var is the measure of approximate intersection area of both bounding boxes. When the dispersion (i.e., var) is high, DM is high. That is, DM gets slowly smaller with distance. When this occurs, the GT and the DT objects are more matched. When the dispersion (i.e., var) is low, DM is low and gets quickly smaller with distance. When this occurs, the GT and the DT objects are less matched.

Thus, the DM metric uses a combination of distance and possible intersection area which is oriented about the unit distance vector for a better matching determination. For example, when the unit distance vector illustrated in FIGS. 5A and 5B changes its orientation between GT and DT, the metric var defines the intersection of the bounding boxes on the unit distance direction and allows for a genuine approximation of the IOU method.

Figure 6B:
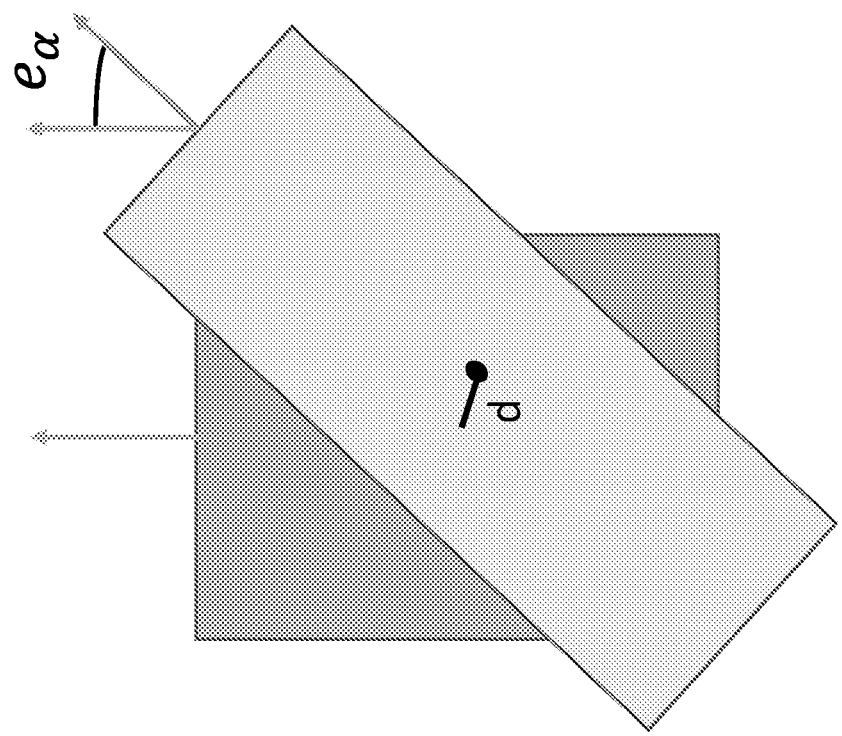
FIGS. 6A and 6B are plan views of angle matching between a reference bounding box and a test bounding box.
Figure 6A:
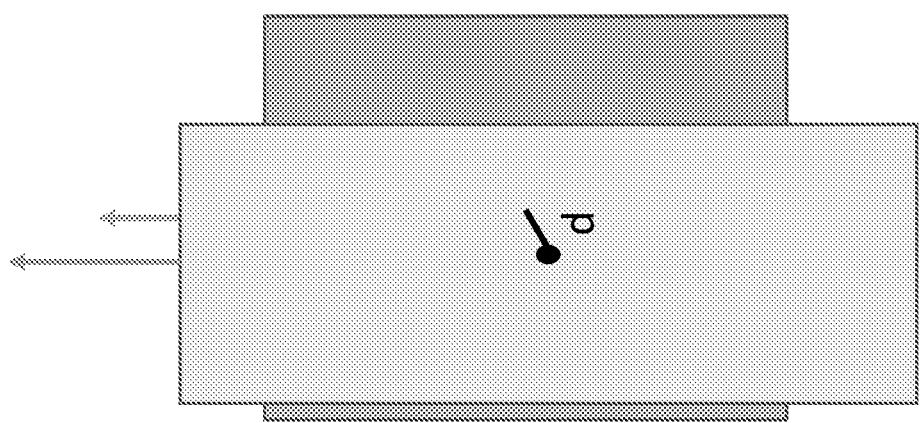

Thus, DM considers distance and orientation of objects about the relative yaw angle between GT and DT. However, when the distance approaches 0, the DM value approaches 1 even for different object orientations. Additionally, objects begin to intersect in all directions. Therefore, Angle Match (AM) may be used for close objects. FIGS. 6A and 6B illustrate a yaw angle difference of zero (FIG. 6A) and a yaw difference of $e_\alpha$ (FIG. 6B). In FIG. 6A, the DT bounding box and the GT bounding box are aligned or nearly aligned, while in FIG. 6B, the DT object is rotated about by 45 degrees.

The variable $e_\alpha$ (i.e., the difference of the yaw angles of the bounding boxes GT and DT) has a range defined by Equation 15.

$$0 \leq e_\alpha = |\alpha_{GT} - \alpha_{DT}| \leq \pi/2 \quad (15)$$

An AM formula may be empirically approximated on $e_\alpha$ as shown in Equation 16.

$$AM = \cos\left(\left(\frac{e_\alpha}{2}\right)\left(\frac{1}{1 + c_{am} * d}\right)\right) \quad (16)$$

Here, the worst scenario is when $e_\alpha = 90°$ (i.e., objects are perpendicular) and the best case scenario is when $e_\alpha = 0°$ (i.e., objects are aligned). The first term in the cosine term divides the yaw difference by 2. This limits the value of AM to be greater than $\cos(90°/2) = 0.707$. The second term in the cosine term restricts the effect of AM with distance. That is, AM is more effective when objects are close and less effective when objects are distant from each other. Less effective, in this context, is that AM is close to 1 due to high d values (and thus does not affect SOM=VM*DM*AM). The constant CAM may be 0.5 or any value between 0 and 1. For high d values, DM is sufficient for better overall match decisions. Ideally, AM should not have a huge effect over VM and DM. In this example, the maximum effect of AM is $\cos(45°/2) = 0.707$ for a maximum angle difference $$e_\alpha = \frac{\pi}{2} = 90°$$

and d=0 meters. Similarly, when $e_\alpha = 0$ or for high d values, AM will be at or near 1, which means that AM does not have an effect on the total metric. Optionally, determining the AM includes modulating or changing a yaw angle difference or an angle match effect between the reference object and the test object based on a distance between the reference object and the test object.

Figure 7:
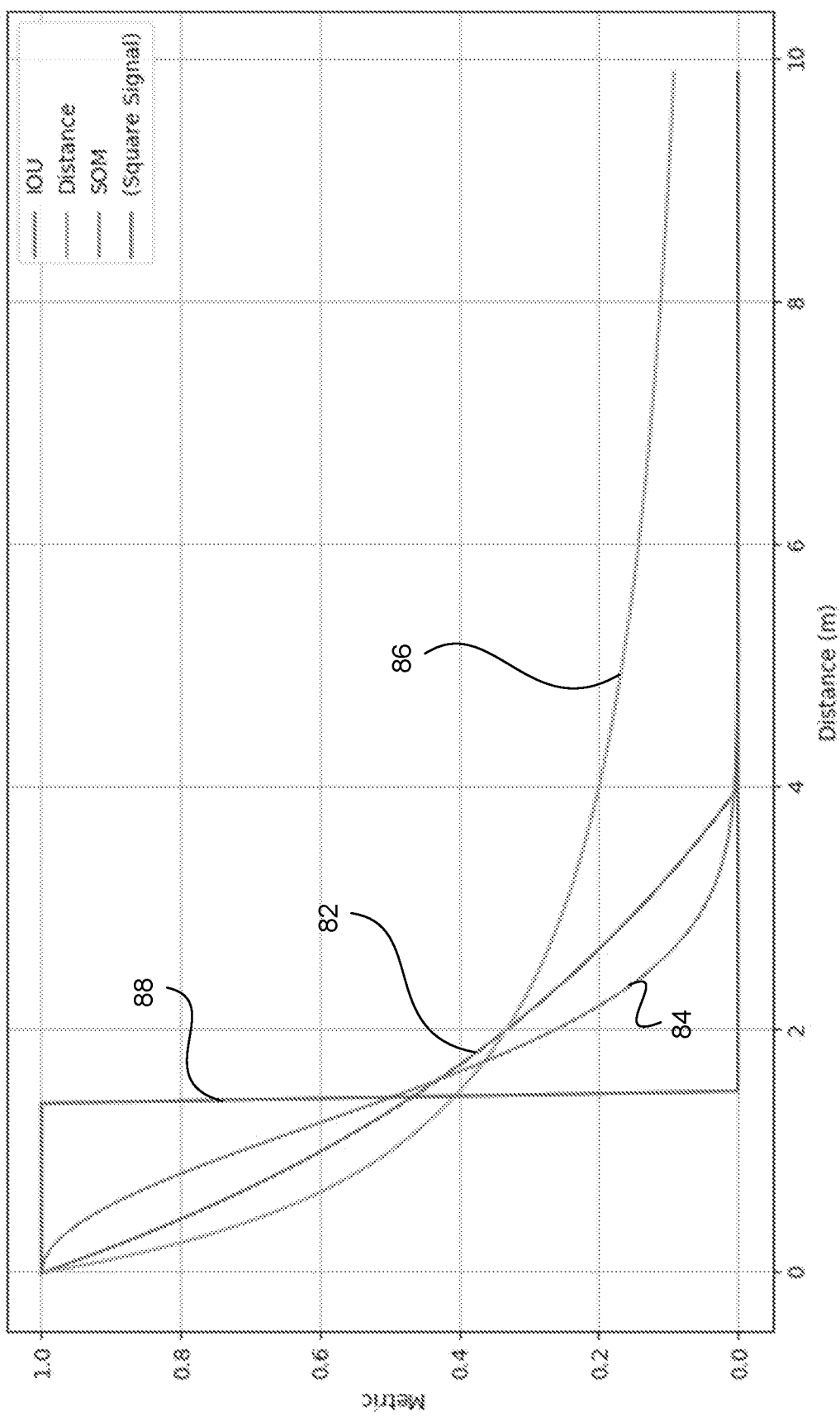
FIG. 7 is a plot comparing multiple matching methods for matching a reference bounding box and a test bounding box.

Referring now to FIG. 7, different metric values are compared and plotted over distance between the GT and DT object centers. Here, it is clear that the IOU method plot 82 linearly decreases (i.e., creates close metrics for objects and therefore is not distinguishable for some close objects). The SOM method plot 84 has a Z-shape, in which the left side of the SOM plot has a more stable acceptance region for matching. The right side of the SOM plot illustrates a more stable rejection region for matching. Thus, the SOM method provides better separation than IOU in both regions, as the IOU method is linear and therefore not separable. The distance method plot 86 illustrates that the distance method is the simplest method, where simply the 2D distance between the GT bounding box and the DT bounding box is used. This method cannot distinguish the objects when the distance is above approximately 4 meters. The distance method is generally considered to have poor recognition performance. The square signal plot 88 illustrates values of 1 when the SOM method is higher than 0.5 and values of 0 when the SOM method is less than 0 and illustrates the SOM method performance.

Thus, the present invention offers many advantages over traditional matching methods such as IOU. For example, the SOM method may be up to twenty times faster than the IOU method in some programming languages. It also does not require any special libraries to determine. Unlike some machine learning algorithms, the SOM method does not require a priori statistical information or training. Therefore, the SOM method is simple enough to implement in real industry applications using basic geometry.

The SOM method provides a Z-shape decision curve with respect to distance with clear acceptance (i.e., left of square signal) and rejection regions (i.e., right of square signal). The SOM method may also provide a sharp region between accept and reject range (i.e., a sharp cut-off region). The SOM method measures the approximate intersection area of the GT bounding box and the DT bounding box with a small amount of complexity. All three metrics (i.e., VM, DM, and AM) are explicit (i.e., not implicit). Therefore, all metrics may be tuned by changing the parameters for special purposes and use cases. The SOM method takes advantage of all seven parameters of the bounding box to provide a simple and accurate matching algorithm.

The SOM method provides different values for different orientations of the same objects as illustrated in FIG. 8. However, if intersected areas are same, the IOU method provides the same result for all three cases illustrated in FIG. 8. The SOM method described herein distinguishes difference between the same orientations, which is not attained by the IOU method.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S.

Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for matching a reference object and a test object, the method comprising:
   receiving, at an electronic control unit (ECU) disposed at a vehicle, parameters of a reference object;
   providing a test object in a field of sensing of at least one sensor disposed at the vehicle, wherein parameters of the test object are determined by the ECU of the vehicle based on processing at the ECU of data captured by at least one sensor disposed at the vehicle;
   determining, by the ECU, a volume match of the reference object and the test object based on a volume of the reference object and a volume of the test object;
   determining, by the ECU, a distance match of the reference object and the test object based on a center and an orientation of the reference object and a center and an orientation of the test object;
   determining, by the ECU, an angle match of the reference object and the test object based on a yaw angle of the reference object and a yaw angle of the test object;
   determining, by the ECU, a superposition of the volume match, the distance match, and the angle match based on a multiplication of the determined volume match, the determined distance match, and the determined angle match; and
   determining, by the ECU, a degree of matching of the reference object and the test object based on the determined superposition.

2. The method of claim 1, wherein determining the distance match comprises determining a Gaussian distribution of the center and the orientation of the reference object and the center and the orientation of the test object.

3. The method of claim 1, wherein determining the distance match comprises determining a variance based on a length, a width and a height of the reference object and a length, a width and a height of the test object.

4. The method of claim 3, wherein the variance comprises a dispersion of the reference object and the test object.

5. The method of claim 1, wherein determining the angle match of the reference object and the test object comprises modulating a yaw angle difference between the reference object and the test object based on a distance between the reference object and the test object.

6. The method of claim 1, wherein determining the angle match comprises assuming the center of the reference object aligns with the center of the test object.

7. The method of claim 1, wherein the reference object and the test object comprise bounding boxes.

8. The method of claim 7, wherein each of the bounding boxes is representative of a respective vehicle.

9. The method of claim 1, wherein the reference object and the test object are on the same x-y plane.

10. The method of claim 1, wherein determining the angle match of the reference object with the test object is based on a distance between the test object and the reference object.

11. The method of claim 1, wherein determining the angle match of the reference object and the test object comprises changing an angle match effect based on the distance between the reference object and the test object.

12. A method for matching a reference object and a test object, the method comprising:
   receiving, at an electronic control unit (ECU) disposed at a vehicle, parameters of a reference object;
   providing a test object in a field of sensing of at least one sensor disposed at the vehicle, wherein parameters of the test object are determined by the ECU of the vehicle based on processing at the ECU of data captured by at least one sensor disposed at the vehicle;
   determining, by the ECU, a volume match of the reference object and the test object based on a volume of the reference object and a volume of the test object;
   determining, by the ECU, a distance match of the reference object and the test object based on a center and an orientation of the reference object and a center and an orientation of the test object;
   wherein determining the distance match comprises determining a variance based on a length, a width and a height of the reference object and a length, a width and a height of the test object;
   determining, by the ECU, an angle match of the reference object and the test object based on a yaw angle of the reference object and a yaw angle of the test object;
   wherein determining the angle match of the reference object and the test object comprises modulating a yaw angle difference between the reference object and the test object based on a distance between the reference object and the test object;
   determining, by the ECU, a superposition of the volume match, the distance match, and the angle match based on a multiplication of the determined volume match, the determined distance match, and the determined angle match; and
   determining, by the ECU, a degree of matching of the reference object and the test object based on the determined superposition.

13. The method of claim 12, wherein determining the distance match comprises determining a Gaussian distribution of the center and the orientation of the reference object and the center and the orientation of the test object.

14. The method of claim 12, wherein the variance comprises a dispersion of the reference object and the test object.

15. The method of claim 12, wherein determining the angle match comprises assuming the center of the reference object aligns with the center of the test object.

16. The method of claim 12, wherein the reference object and the test object comprise bounding boxes.

17. The method of claim 16, wherein each of the bounding boxes is representative of a respective vehicle.

* * * * *